United States Patent [19]

Schexnayder

[11] 4,105,214
[45] Aug. 8, 1978

[54] SEALING ARRANGEMENT FOR BRAKE HOUSING

[75] Inventor: Lawrence F. Schexnayder, Joliet, Ill.

[73] Assignee: Caterpillar Tractor Co., Peoria, Ill.

[21] Appl. No.: 524,115

[22] Filed: Nov. 15, 1974

[51] Int. Cl.² .............................................. F16J 15/34
[52] U.S. Cl. ..................................................... 277/74
[58] Field of Search ................... 277/3, 15, 16, 71, 72, 277/73, 74

[56] References Cited

U.S. PATENT DOCUMENTS

| 3,031,197 | 4/1962 | Wilkinson | 277/16 |
| 3,542,374 | 11/1970 | Neilson | 277/16 |
| 3,843,140 | 10/1974 | Mayer et al. | 277/134 |

*Primary Examiner*—Robert I. Smith
*Attorney, Agent, or Firm*—Wegner, Stellman, McCord, Wiles & Wood

[57] ABSTRACT

A sealing structure for use in an oil-cooled disc brake apparatus or the like, having a buffer seal for providing extended life and improved functioning of the face seals thereof. The buffer seal provides a pressure-regulating function in controlling the delivery of lubricating coolant fluid to the brake and face seals.

16 Claims, 2 Drawing Figures

SEALING ARRANGEMENT FOR BRAKE HOUSING

BACKGROUND OF THE INVENTION

1. Field of the Invention

This invention relates to fluid seals and in particular to buffer seals for protecting face-type seals from excessive pressures.

2. Description of the Prior Art

In U.S. Pat. No. 3,180,648 of Bernard F. Kupfert et al, owned by the assignee hereof, an improved ring-type face seal is disclosed for sealing confronting surfaces of relatively rotatable parts. As disclosed therein, lubricant is introduced under pressure into the apparatus and the seals are adapted to provide improved fluid sealing against such pressure.

It has been found that, in certain applications of such seals, such as in conjunction with oil-cooled disc brakes, as disclosed in Elmer R. Bernson et al U.S. Pat. No. 3,072,220, and Curtis F. Cummins U.S. Pat. No. 3,136,389, owned by the assignee hereof, conditions may arise wherein relatively high back pressure may obtain tending to shorten the useful life of the seals. Illustratively, where such seals have been used in off-highway truck applications, the back pressures have been relatively low so that long, trouble-free life has been readily obtainable. Where the seals, however, are utilized in applications such as in connection with the rear wheel means of a tractor-scraper, several problems arise. The wheelbase of such tractor-scrapers is considerably longer than that of conventional trucks and, thus, relatively long transfer lines are required. It is preferable that such fluid transfer lines be of relatively small diameter to reduce the bulk of the lines crossing over the hitch portion of the apparatus. The increased length and reduced diameter of the fluid transfer conduits produces a substantial increase in the back pressure of the lubricating coolant delivered therethrough to the brake means.

Further, in such tractor-scraper apparatus, the diameter of the face seals required is substantially larger than that required in the truck applications, the increase being in the order of 8 inches to 15 inches and thereby requiring a somewhat less resilient seal, reducing the ability thereof to accommodate high back pressures for any protracted period of time.

Where the need for the lubricating coolant is intermittent, or the environmental temperature conditions are relatively low, increased viscosity in the lubricating coolant fluid causes further increase in the back pressure.

Further, tractor-scraper wheels are substantially larger than conventional truck wheels and, thus, relatively large disc brake elements are conventionally required. The increase in the surface area of the disc brakes further tends to restrict the lubricating coolant fluid flow through the apparatus, thereby again increasing back pressure and aggravating the back pressure problem as discussed above.

A number of prior devices have been developed for balancing pressures in fluid control devices. Illustratively, in Floyd S. Dadds et al U.S. Pat. No. 3,679,216, owned by the assignee hereof, a pressure-balanced track roller for underwater use is disclosed having piston or diaphragm means for maintaining face loads on the seal rings when the track roller is operated at substantial depths.

Additionally, Archibald S. Telfer U.S. Pat. Nos. 1,474,454 and 1,737,870, show a centrifugal pump utilizing pressure-balancing means; Kenton D. McMahan et al U.S. Pat. No. 2,575,923 shows a method and apparatus for pumping volatile liquids utilizing pressure-balancing means; and Robert W. Erikson et al U.S. Pat. No. 2,931,314 shows an air purging apparatus for pumps permitting purging of the air to atmosphere and rapid closure of the pressure responsive valve on pump shutdown.

SUMMARY OF THE INVENTION

The present invention comprehends an improved sealing structure utilizing face seals such as shown in the above-identified Kupfert et al patent, effectively preventing high pressure fluid conditions from adversely affecting the operation and life of the face seals.

More specifically, the present invention comprehends providing, in such a sealing structure, improved means providing a preselected pressure-regulated flow restriction of coolant fluid to the face seals for maintaining a desirable preselected lubrication and cooling thereof. In the illustrated embodiment, the flow restriction means comprises a buffer seal extending across one portion of the passage means for delivering the lubricating coolant fluid to the face seals. The buffer seal defines a preselected small orifice there-through to provide the desired pressure-regulating function. Thus, notwithstanding the delivery of lubricating coolant fluid to the brake means under relatively high pressure, the buffer seal functions to limit the pressure of the fluid acting on the face seals thereby assuring long, trouble-free life.

The buffer seals may comprise annular seals extending radially across an annular portion of the fluid conducting passage means with the orifice therethrough extending axially. The buffer seal means may include a base portion removably received in an annular recess of a wall portion defining the passage means.

The buffer seal may be formed of resilient material to facilitate installation in the mounting recess. Alternatively, the buffer seal may comprise a segmental annular seal.

A plurality of such buffer seals may be provided for use in conjunction with a corresponding plurality of face seals. The lubricating coolant fluid may be delivered to a common chamber housing the brake and communicating with each of the buffer seal passages for provision of generally similar pressure conditions to the fluid delivered to each of the face seals under the individual control of the respective buffer seals. In the illustrated embodiment, the plurality of buffer seals comprises identical orifice devices.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
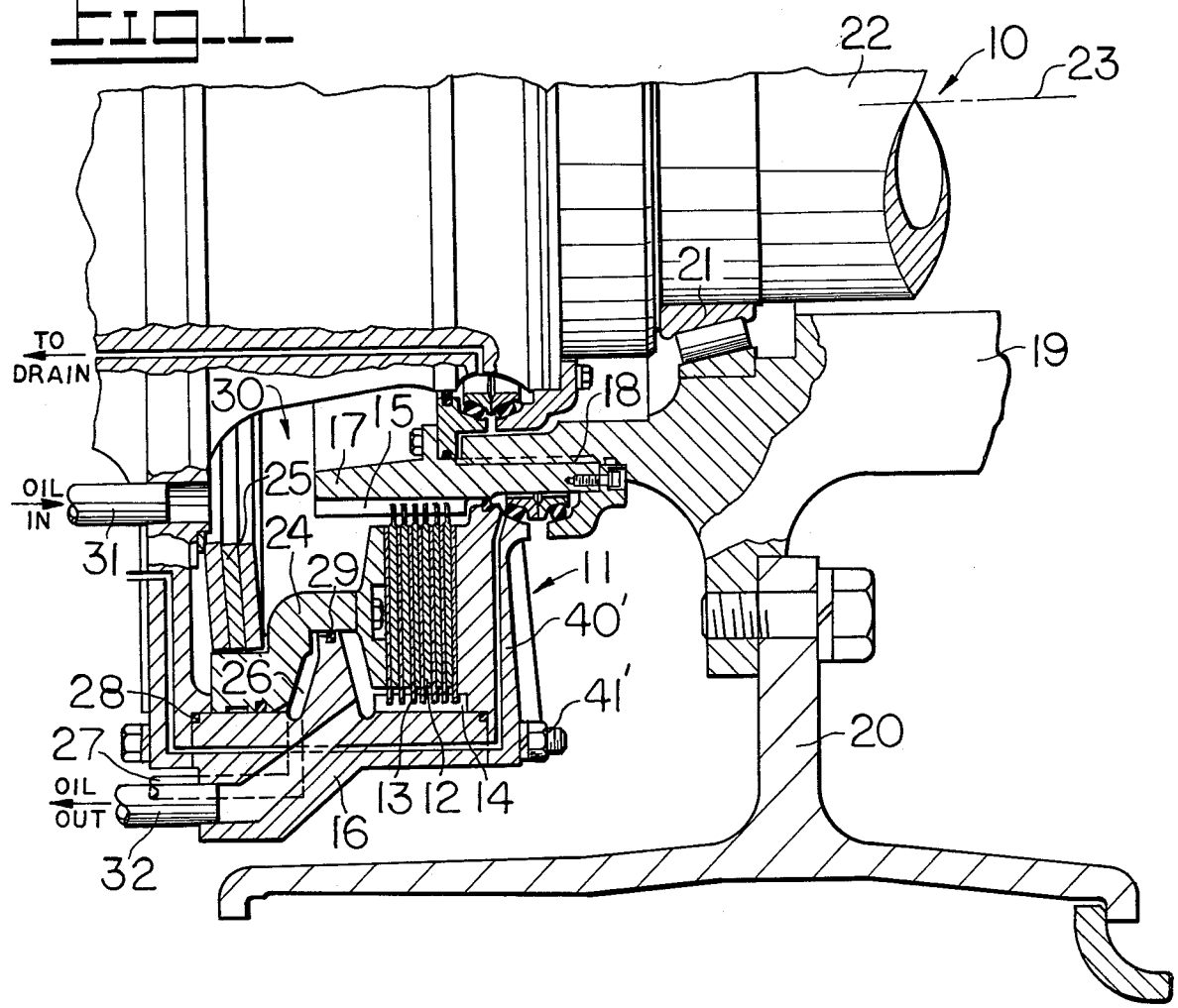
FIG. 1 is a fragmentary section of a sealing structure embodying the invention utilized in conjunction with a disc brake apparatus.

In the exemplary embodiment of the invention as disclosed in the drawing, a rotary apparatus generally designated 10 is shown to include an oil-cooled disc brake 11 having a plurality of interleaved friction disc elements 12 and 13 connected respectively to coaxial splines 14 and 15. The brake is enclosed by a rigid housing 16 with spline 14 secured against rotation thereto. Spline 15, in turn, is secured to a rotary coupling member 17 attached by a spline 18 to a hub 19 of a wheel 20. Hub 19 is rotatably supported by means of bearings 21 on a fixed shaft, or axle, 22 defining an axis 23. Shaft 22 may be suitably supported by the main frame (not shown) of the wheeled vehicle to which the apparatus is mounted.

Disc brake 11 is actuated by means of a piston 24 to overcome the braking bias of springs 25 which normally cause frictional engagement between the interleaved brake discs 12 and 13 to brake the wheel 20. Piston 24 is actuated by suitable brake fluid delivered to a chamber 26 from a brake line 27. In earthmoving and similar applications, the brake releasing fluid is delivered automatically to chamber 26 as a function of the shifting of the transmission into driving condition.

As indicated briefly above, the present invention is concerned with the sealing of the brake housing 16 to the associated structure. A first pair of O-rings 28 and 29 is provided at opposite sides of the piston 24 for movably sealing the piston to the housing. As shown in FIG. 1, housing 16 defines a chamber generally designated 30 in which the brake discs 12 and 13 are disposed and adapted to receive a quantity of pressurized lubricating coolant from a supply line 31. The chamber is exhausted through a return line 32.

Figure 2:
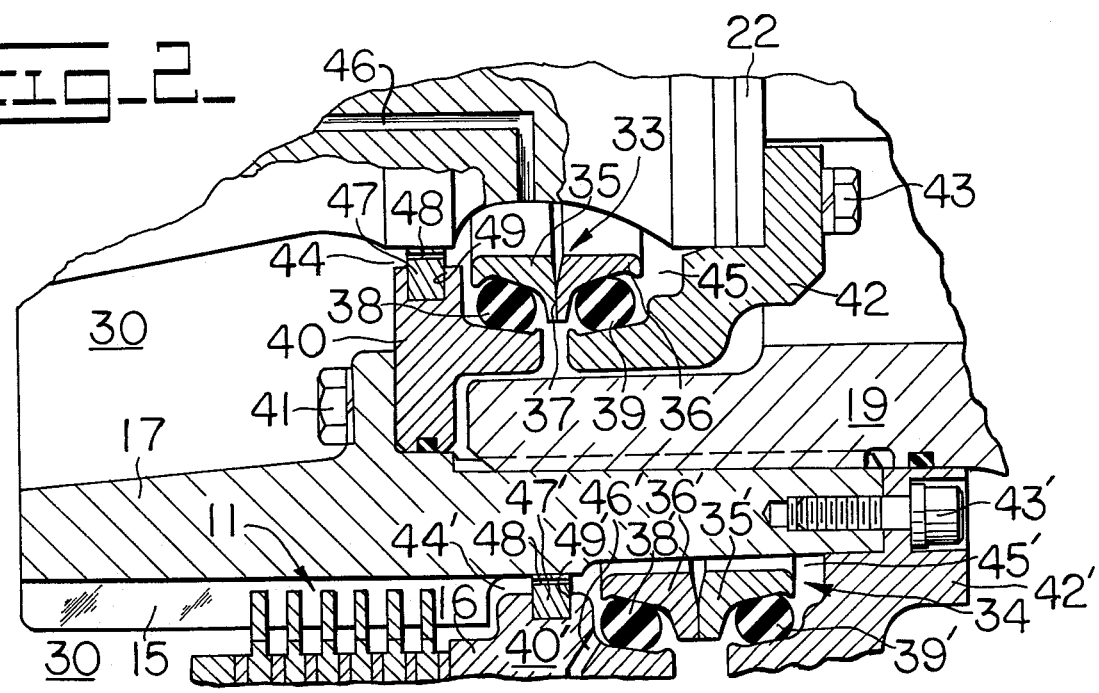
FIG. 2 is a fragmentary enlarged section of a portion thereof.

Referring now to FIG. 2, a pair of face seals generally designated 33 and 34 is provided for sealing the rotating elements of the apparatus 10 to the nonrotating elements. As relatively high rotational speeds may be involved, it is desirable to provide lubricating coolant to the face seals as well as to the brake and in the present application, the coolant fluid is delivered thereto from the chamber 30.

More specifically, each of face seals 33 and 34 comprises an annular seal defined by a stationary seal ring 36 and a rotating seal ring 35 having sliding engagement at confronting portion 37. Seal ring 35 is supported by a torus of elastic material 38 and seal ring 36 is supported by a similar torus of elastic material 39. Thus, as shown in FIG. 2, torus 38 is supported by an adapter 40 secured to rotary coupling member 17 by suitable removable securing means, such as bolt 41, and torus 39 is supported by an adapter 42 secured to axle 22 by suitable removable securing means, such as bolts 43.

Adapter 40 defines, with axle 22 an annular passage 44 extending from chamber 30 to a face seal chamber 45 cooperatively defined by adapters 40 and 42, face seal 33 and axle 22. Lubricating coolant fluid delivered to chamber 30 flows through passage 44 to provide lubrication and cooling of the face seal 33 in the high speed rotation of the apparatus. The axle may be provided with a drain passage 46 for returning the lubricant coolant fluid to the pressure source (not shown). As shown, face seal 34 is similar to face seal 33 including a stationary ring seal 36', a rotating seal ring 35', a torus of elastic material 38' and 39', respectively. Face seal 34 is received in a face seal chamber 45' cooperatively defined by an adapter 40' secured to housing 16 by removable securing means 41' and adapter 42' removably secured to rotary coupling member 17 by a bolt 43'. As shown in FIG. 1, adapter 40' may cooperate with housing 16 in closing the outer end of chamber 30 and defines with rotary coupling member 17 an annular passage 44' communicating between chamber 30 and the face seal chamber 45'. Thus, passage 44' functions similarly to passage 44 in conducting lubricating coolant fluid from chamber 30 to the face seal 34. Adapter 40' and housing 16 cooperatively define a drain passage 46' for returning the lubricating coolant fluid from chamber 45'.

The present invention comprehends providing means regulating the pressure of the lubricating coolant fluid in the respective face seal chambers 45 and 45' and in the illustrated embodiment, the pressure-regulating means comprises means in the flow passages 44 and 44' providing a preselected pressure-regulating flow restriction of the coolant fluid. As best seen in FIG. 2, the restriction means comprises a buffer seal element 47 extending across passage 44, and a similar buffer seal element 47' extending across passage 44'. each of buffer seal elements 47 and 47' comprises an annular seal means having one or more through passages 48 defining flow restriction orifices for effecting the desired pressure regulation of the lubricating coolant fluid delivered to the face seal chambers 45 and 45'. The buffer seal elements may be formed of suitable resilient material permitting installation thereof in suitable recesses 49 and 49' in adapters 40 and 40', respectively, so as to have positive sealing engagement between the adapters and the confronting members 22 and 17, respectively. Alternatively, the buffer seal elements 47 and 47' may be formed of annular segments with the spacing between the segment ends functioning similarly to the orifices 48 in providing a pressure-dropping flow restriction between the chamber 30 and the face seal chambers 45 and 45'.

Thus, the buffer seals provide a continuous flow of lubricating coolant fluid against the face seals 33 and 34 keeping the seals moist and cool notwithstanding high speed operating conditions thereof. The fluid is continuously circulated through the chambers 45 and 45' back to the pressure source by means of the drain passages 46 and 46'.

In the illustrated embodiment, the buffer seals comprise identical elements and, thus, effectively provide similar lubricating coolant fluid flow to the respective face seals. As will be obvious to those skilled in the art, suitable selective control of the pressure regulating functioning of the buffer seals may be effected by correspondingly varying the orifice sizes as desired.

Thus, the present invention comprehends an improved seal arrangement wherein face-type seal rings are provided with relatively high flow rates of lubricating coolant fluid while yet the fluid pressure acting on the face seals is effectively regulated so as to assure long, trouble-free life thereof. The seal arrangement is extremely simple and economical of construction while providing the above-discussed advantages.

The foregoing disclosure of specific embodiments is illustrative of the broad inventive concepts comprehended by the invention.

I claim:

1. In a rotary drive mechanism having means defining a chamber in which the mechanism is disposed, said chamber having an inlet and an outlet for providing a flow of lubricating coolant through the chamber for cooling the mechanism therein, and sealing structure having an annular face seal defined by a pair of yieldingly engaging seal rings and resilient biasing element sealingly closing said chamber, the improvement comprising: divider means including a buffer seal dividing said chamber into a main portion receiving said mechanism and an outlet portion confronting said face seal, said divider means having a passage therethrough for conducting pressurized lubricating coolant fluid from said chamber main portion to said chamber outlet portion for cooling and lubricating said face seal, said passage having flow restricting means for providing a preselected pressure regulating flow restriction of the coolant fluid from said chamber main portion to said chamber outlet portion; and means defining a discharge passage from said chamber outlet portion, whereby fluid is flowed from said inlet through said chamber main portion to said outlet and concurrently through said flow restricting passage to said chamber outlet portion and from said chamber outlet portion to said discharge passage for maintaining concurrently a preselected cooling of said mechanism and a preselected lubrication and cooling of said face seal.

2. The rotary drive mechanism of claim 1 wherein said flow restriction means comprises a buffer seal element having a preselected small orifice therethrough.

3. The rotary drive mechanism of claim 1 wherein said buffer seal comprises an element formed of a resilient material having said flow passage therethrough.

4. The rotary drive mechanism of claim 1 wherein said flow rextriction means comprises an annular buffer seal element having an orifice extending axially therethrough.

5. The rotary drive mechanism of claim 1 wherein said flow restriction means comprises a segmented annular buffer seal element having an orifice extending axially therethrough.

6. The rotary drive mechanism of claim 1 wherein said flow restriction means comprises an annular buffer seal element having an orifice extending axially therethrough, said chamber means further defining a radially opening annular recess, and said buffer seal element including a base portion received in said recess.

7. The rotary drive mechanism of claim 1 wherein said flow restriction means comprises an annular buffer seal element having an orifice extending axially therethrough, said chamber means further defining a radially inwardly opening annular recess, and said buffer seal element including a base portion received in said recess.

8. The rotary drive mechanism of claim 1 wherein said flow restriction means comprises an annular buffer seal element having an orifice extending axially therethrough, said chamber means further defining a radially inwardly opening annular recess, and said buffer seal element including a base portion yieldingly received in said recess.

9. The rotary drive mechanism of claim 1 wherein said passage means further defines a drain passage for draining coolant fluid from the chamber.

10. In a rotary drive mechanism having means defining a chamber in which the mechanism is disposed, said chamber having an inlet and an outlet for providing a flow of lubricating coolant through the chamber for cooling the mechanism therein, and sealing structure having a pair of annular face seals each defined by a pair of yieldingly engaging seal rings and resilient biasing elements sealingly closing said chamber, the improvement comprising:

first and second divider means including a buffer seal dividing said chamber into a main portion receiving said mechanism and first and second outlet portions respectively confronting said face seals, each said divider means having a passage therethrough for conducting pressurized lubricating coolant fluid from said chamber main portion to the corresponding chamber outlet portion for cooling and lubricating the confronted face seal, each said passage having flow restricting means for providing a preselected pressure regulating flow restriction of the coolant fluid from said chamber main portion to said chamber outlet portions; and means defining discharge passages from said chamber outlet portions, whereby fluid is flowed from said inlet through said chamber main portion to said outlet and concurrently through said flow restricting passages to said chamber outlet portions and from said chamber outlet portions to said discharge passages for maintaining concurrently a preselected cooling of said mechanism and a preselected lubrication and cooling of said face seals.

11. The rotary drive mechanism of claim 10 wherein said face seals are coaxially disposed, and said chamber outlet portions comprise coaxial annular chamber portions.

12. The rotary drive mechanism of claim 10 wherein said face seals are coaxially disposed, and said chamber outlet portions comprise radially spaced coaxially annular chamber portions.

13. The rotary drive mechanism of claim 10 wherein said mechanism comprises brake means.

14. The rotary drive mechanism of claim 10 wherein said buffer seal passages define identical orifice devices.

15. The rotary drive mechanism of claim 10 wherein said flow restricting means of the passages comprise similar means.

16. The rotary drive mechanism of claim 1 wherein said flow restricting means comprises an element carried by said means defining said chamber.

* * * * *